Aug. 8, 1944.  V. WALKER  2,355,345
OPTICAL DEVICE AND METHOD OF MAKING SAME
Filed Oct. 2, 1941
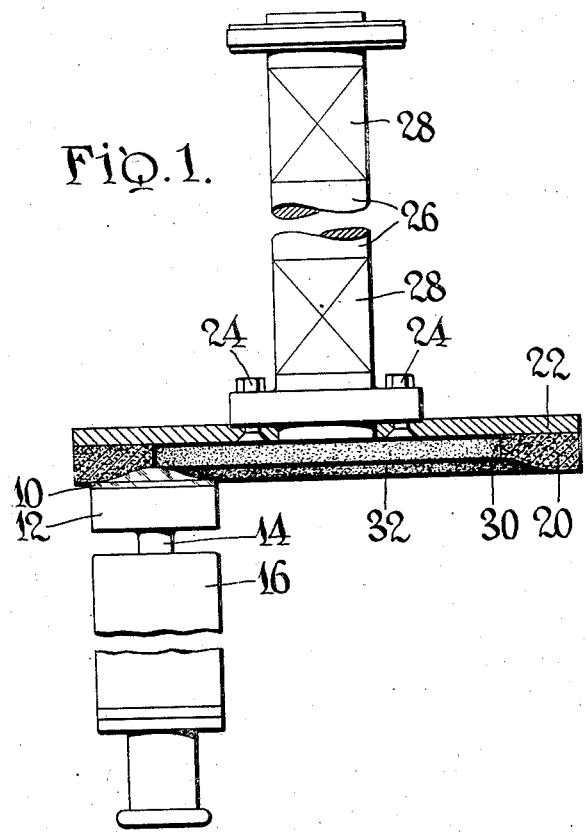
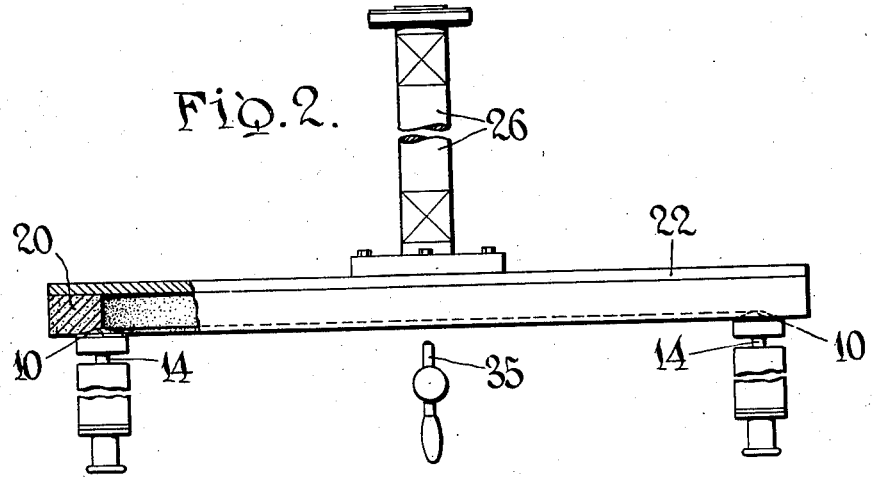
INVENTOR
*Victor Walker*
BY
*Bean, Brooks, Buckley & Bean.*
ATTORNEYS Patented Aug. 8, 1944

2,355,345

UNITED STATES PATENT OFFICE 2,355,345

OPTICAL DEVICE AND METHOD OF MAKING SAME

Victor Walker, Fort Erie, Ontario, Canada, assignor to AlnCin, Inc., Buffalo, N. Y.

Application October 2, 1941, Serial No. 413,330

6 Claims. (Cl. 51—284)

This invention relates to the manufacture of lenses, and the like, and more particularly to an improved method and means for abrasively contouring glass stock into the form of lenses or the like.

Prior glass shaping methods may be classified roughly into pressing or molding processes; grinding by loose abrasives under relatively moving grinding pads; or cutting by bonded abrasive wheels. It is well known that pressed or molded lenses are invariably inferior for precision optical purposes because of the imposition of surface imperfections upon the glass stock by the contacting surface portions of the mold or die, and because of shrinkage and warpage of the glass stock during cooling of the previously heated glass. The use of loose abrasive grinding methods invariably involves relatively tedious and difficult operating technique, and the resultant products are invariably non-uniform as to quality and relatively expensive as articles of manufacture except in the case of strictly spherically surfaced lenses which are, of course, inherently inferior because of their abberation characteristics. The use of cutting by bonded abrasive wheels in accord with previously known principles has invariably been attended with undesirable results in the form of imperfections in the surface of the product due to inability to control the cutting wheel so that the latter does not oscillate radially and leave imprints termed "chatter marks" on the finished surface, and other imperfections such as burns, scratches, or the like.

More specifically, the so-called grinding methods of the prior art are satisfactory only in connection with the manufacture of spherically surfaced lenses or the like because of the mode of operation of the loose abrasive upon the glass stock. The loose abrasive is caused to act upon the glass stock by impressing thereover a form or pad made of metal or similar substance, which is faced so as to complement the desired contour of the finished product. The grinding form and the stock piece are relatively rotated while being pressed together so as to provide a grinding action, but in order to avoid the formation of annular grooves and rills upon the surface of the finished product it is also necessary to oscillate the grinding form relative to the stock piece radially of the axis of relative rotation. Only by such method is it possible to obtain a smooth surface, and it is, of course, inherently impossible to apply such radial oscillatory movement in connection with the manufacture of anything but spherically surfaced objects. Consequently, such methods are entirely unsuited to the manufacture of many glass objects, such as aspherical lenses, for example.

In connection with the prior art glass "cutting" methods referred to hereinabove, a bonded abrasive wheel is arranged to contact at its periphery with the glass stock piece until the cut has reached the desired proportions. Thus, the cutting wheel will first be dressed to the necessary peripheral contour for cutting the desired shape and then brought into play against the stock piece, and as the cutting action progresses the zone of contact between the stock piece and the cutting wheel increases throughout a constantly enlarging area until the cutting wheel has buried itself to the necessary depth within the stock piece. Thus, any irregularities in the abrasive constituency or structure of the periphery of the cutting wheel will be immediately reflected in the finished surface in the form of scratches or grooves therein. Also, inasmuch as "area" contact exists between the cutting wheel and the stock piece during this type of operation, the sludge or dislodged abrasive and glass particles have no escape from the situs of the cutting action except as they may be carried through the zone of area contact by the movement of the cutting wheel, whereby the surface of the stockpiece is further scored and/or "burned" by grinding of the sludge particles into the stock piece surface. Also, such cutting operations usually result in the formation of "chatter marks" in the finished surface because of the practical inability to exactly balance the cutting wheel and its mounting spindle. The slightest unbalancing of the cutting wheel, as will be due to unequal wearing away thereof under normal surface conditions for example, induces a magnified radial oscillation of the cutting wheel and the mounting spindle with the result that in connection with such methods the formation of "chatter marks" upon the surface of the product is practically inevitable. Thus, a precise optical surface is impossible of attainment through the use of such manufacturing methods.

One of the objects of the present invention is to provide a distinctly new and improved method for contouring glass stock into curved surface forms through use of bonded abrasive wheels.

Another object of this invention is to provide an improved method for the purpose stated wherein the contouring wheel is arranged to engage the stock piece with line form of contact, as distinguished from an area form of contact, in an improved manner.

Another object of this invention is to provide an improved method for the purpose stated whereby both spherically and aspherically surfaced glass objects may be produced without use of the principle of oscillation of the contouring wheel radially of the axis of relative rotation between the contouring wheel and the stock piece.

Another object of this invention is to provide an improved method of contouring glass stock through use of a revolving bonded abrasive wheel in an improved manner whereby the possibility of imposing "chatter marks" upon the stock piece due to unbalanced conditions of the wheel, is eliminated.

Another object of this invention is to provide an improved method for contouring glass stock through use of a bonded abrasive wheel whereby the contouring sludge is ejected from the situs of the contouring action in an improved manner.

Another object of this invention is to provide an improved method for the purpose stated in connection with which the contouring wheel and the stock piece are so rotated and so arranged relative to one another as to provide an improved form of contouring action.

Other objects and advantages of the invention will appear from the specification hereinafter.

In the drawing:

Fig. 1 is an elevation of an apparatus for performing a rough contouring step of the method of the invention, illustrating the contouring wheel portion of the apparatus thereof in section; and Fig. 2 is a view similar to Fig. 1 of an apparatus for performing a fine contouring method of the invention.

Fig. 1 illustrates the method of the invention being practiced upon a glass stock piece designated at 10 and which is in the form of an aspherically curved plano-convex lens. The stock piece is shown mounted upon a pad 12 extending from a spindle 14 which is in turn rotatably carried by a bearing 16 and arranged to be rotated about the longitudinal axis of the spindle 14 by any suitable motor means (not shown). The mounting of the spindle 14 and the pad 12 and of the stock piece 10 relative to the pad may be in accord with any suitable practice as is presently customary in the optical manufacturing art. A bonded abrasive wheel 20 is carried by a backing plate 22 which is in turn detachably mounted by means of screws 24 upon a suitably flanged portion of a driving spindle 26. The spindle 26 is rotatably carried upon a suitable stationary support (not shown) by means of bearing means indicated diagrammatically as engaging the shaft 26 at the positions 28—28. Suitable motor means (not shown) are operatively engaged with the shaft 26 for rotating the latter about its longitudinal axis.

It will be particularly noted that both the stock piece 10 and the abrasive wheel 20 are mounted in end facing relation upon their respective spindles and are arranged to oppose each other while the axes of rotation of the respective spindles are in offset parallel relation. The wheel 20 is of annular form; being centrally bored as at 30, and is so dimensioned as to be several times greater in outer diameter than the stock piece 10. The spindles 14—26 are so relatively disposed that the inner wall portion 30 of the abrasive wheel 20 registers with the center of the stock piece 10 while the working face portion 32 of the wheel extends radially therefrom and outwardly so as to overlap the marginal edge portion of the stock piece 10. If any deviation from this arrangement occurs it will be in the nature of an overlapping of the center of the stock piece by the abrasive annulus.

The face portion 32 of the abrasive annulus 20 is contoured so as to complement the prescribed profile of the work piece 10 while in line contact therewith at one side of the axis of symmetry thereof as viewed in Fig. 1. Thus, it will be understood that as the abrasive annulus 20 is rotated about the axis of its spindle 26 the contouring face 32 will be adapted to shape the contacting portion of the stock piece 10 to the profile thereof as illustrated in Fig. 1; and that upon simultaneous rotation of the spindle 14 the stock piece will be rotated so as to cause the contouring action to progress about the entire outer face portion thereof. Preferably, the spindle 26 will be driven so as to cause the abrasive annulus 20 to rotate relatively rapidly, while the spindle 14 will be driven to rotate the work piece 10 relatively slowly and in a counter direction. The abrasive annulus 20 may be formed of any suitable bonded abrasive substance or composition of substances so as to effectively abrade the glass material of the stock piece 10 to the desired surface form thereof, as explained hereinabove. However, the specific apparatus illustrated by Fig. 1 is particularly suited to relatively rough contouring processes of the invention, and for this purpose the annulus 20 may be properly formed of diamond dust impregnated metal or other suitable bonding media. The contouring method of the invention, as illustrated by the apparatus of Fig. 1 and as explained hereinabove, contemplates relatively rapid abrasion of the glass stock piece at a zone of contact which is of strictly "line" form, and which progresses about the center of the stock piece as the latter is revolved until the contouring operation is complete. The disposition of the annulus 20 so as to bring the inner wall 30 thereof in registry with or to slightly overlap the center of the stock piece 10 assures complete contouring of the entire outer face of the stock piece, even though the progressive contouring of the stock piece is provided in response to rotation of the stock piece about its center. Thus, there is no "dead center" region in connection with the contouring operation of the invention wherein relative movement and abrading action is lacking between the annulus 20 and the stock piece, as in some methods of glass "cutting" of the prior art. Consequently, the possibility of formation of a "smudge" spot at the center of the stock piece is eliminated. Also, it will be understood that by causing the spindle 14 to rotate the stock piece 10 in a direction counter to the direction of rotation of the annulus 20, the rate of relative movement between the abrasive annulus 20 and the stock piece 10 will be greatest in connection with the regions of the stock piece where the greatest amount of stock must be removed.

Particular attention is called to the fact that because the contouring face 32 of the abrading annulus 20 is disposed substantially transversely of the axis of rotation thereof, any radial oscillation of the annulus 20 which may be permitted by the spindle 26 due to unbalancing of the revolving mechanism, will be translated into movements of the abrading annulus in directions substantially parallel to contiguous face portions of the work piece, and that thereby the formation of "chatter marks" upon the finished surface of the stock piece, such as would otherwise occur if the stock piece 10 were presented to the abrading wheel 20 against the outer peripheral surface thereof, will be avoided.

Thus, it will be understood that the abrasive annulus 20 may be preformed at its working face 32 in any desired manner so as to provide any desired form of finished face upon the stock piece 10, and that the method of the invention is adapted to provide either spherically or aspherically curved surfaces with equal facility, and with the attention of only relatively unskilled workmen. Because of the "line contact" arrangement between the contouring wheel and the stock piece as provided by the invention, it will be understood that the sludge or loosened abrasive and glass particles resulting from the abrading action will be freely ejected from the situs of the contouring action immediately upon their formation. Thus, the sludge of the contouring operation is not dragged between the work piece and the abrading wheel, as is the case in connection with conventional glass cutting and grinding processes, and gouging or scratching or burning of the stock piece by rubbing with the sludge is thereby avoided. Thus, the abrading annulus 20 is automatically cleaned in an improved manner and is maintained in condition to be capable of efficiently removing stock through the application of relatively small pressures between the wheel 20 and the stock piece. Consequently, a clean contouring operation is obtained, leaving a smooth uninterrupted surface on the stock piece.

Preferably, it will be arranged that the apparatus for maintaining the work piece in pressure contact against the abrasive annulus will be flexible so as to permit relief of unintended pressures therebetween, such as may occur when high spots of the stock piece engage the contouring wheel. Thus, "gouging" of the annulus 20 is avoided, and the contouring surface 32 thereof will remain in proper trim for longer periods of time. Also, it is preferable to arrange that the pressure between the work piece and the contouring wheel will be gradually diminished toward the end of the contouring operation, as it has been found that a smoother finished surface may thus be produced.

Therefore, it will be appreciated that the method of the invention is capable of providing mechanically and optionally perfect lenses, or the like, of either spherically or aspherically surfaced forms, or other glass objects of symmetrically profiled contours; and that the only prerequisite to the manufacture of perfect products in connection with the method of the invention is that the working face portion 32 of the abrasive annulus be truly shaped to complement the desired profile of the finished product. It will be understood that the dressing of the abrasive annulus may be readily accomplished through the use of any suitable dressing tools such as are well known in the art, when used in conjunction with a suitable templet for guiding the dressing operation.

Fig. 2 illustrates the method of the invention being practiced simultaneously upon a plurality of stock pieces 10 which are mounted upon corresponding spindles 14 and are otherwise arranged to be rotated as in the manner of the stock piece mount of Fig. 1. In the arrangement of Fig. 2, however, the abrasive annulus 20 is illustrated as being of enlarged diameter so as to readily accommodate the disposition of a plurality of the stock pieces in spaced relation around the contouring face portion of the abrasive annulus, so that a number of stock pieces will be simultaneously processed as a means of effecting economies of manufacture. It will be understood that each of the spindles 14 will be individually rotated as in the manner of the work piece spindle of Fig. 1, and that the abrasive annulus will be so proportioned, as explained hereinabove in connection with Fig. 1, as to provide the novel contouring action of the invention simultaneously in connection with each of the stock pieces when arranged in pressure contact therewith. A dressing tool 35 is illustrated as being mounted adjacent the abrasive annulus 20 for manual adjustment into operation against the working face portion of the annulus, as it may be required to keep the latter in accurate trim.

I have found that in connection with the manufacture of relatively large lenses or the like wherein substantial quantities of stock must be removed before reduction to finished form, it is preferable to reduce the stock piece by stages. Thus, Fig. 1 will serve to illustrate the first stage of the method of the invention wherein the abrasive annulus 20 is provided of relatively coarsely grained structure so as to be adapted to remove relatively large quantities of stock from the work piece 10 with rapidity. Subsequent to this first stage or rough reduction step of the process the work piece will be presented to the apparatus of Fig. 2 wherein the abrasive annulus member is formed of relatively fine grained structure, so that a final finishing stage of the process may be applied to the work pieces. However, it will be understood that in connection with each stage of the contouring process of the invention the advantages and features of the method thereof as explained hereinabove will be experienced, and that therefore the multiple stage method of the invention involves additional advantages when compared to other multiple stage abrasion methods wherein the earlier or relatively coarser reduction steps do not embody the features and advantages of the contouring method of the apparatus of Fig. 1, as explained hereinabove.

It will be understood that the invention contemplates the proportioning of the abrasive annulus 20 relative to the stock pieces to be processed and adjustment of the speeds of rotation of the work pieces and the abrasive annuluses carrying spindles and of the contact pressures therebetween in such manner as to obtain optimum results. For example, I have found that if the contouring ability of the abrasive annulus is crowded the contacting surface of the work piece tends to "fire" and the structure of the abrasive annulus tends to rapidly deteriorate. Consequently, the rate of relative speed for most efficient abrading action is sought, and careful adjustments of the apparatus to obtain this result will provide efficient operation and a smoothly surfaced finished product. For example, I have found that when using an abrasive annulus of an outside diameter of the order of 10 inches, the annulus should be revolved at about 2000 R. P. M. while the work piece is being revolved from between 2 to 4 R. P. M. I have determined as the result of many experiments that when working with optical glass materials of the usual chemical constituency, the above mentioned rotational speeds and dimensions provide good results.

I claim:

1. A method of shaping a glass body so as to produce thereon a convex shaped finished surface generated about an axis of symmetry, said method comprising the operation of rotating said body about said axis of symmetry while pressing an abrading wheel against said body to thrust thereagainst in the same direction as said axis of symmetry and while rotating said wheel about an axis substantially parallel to but offset from said axis of symmetry, said wheel having an abrading face portion thereof symmetrically contoured relative to said axis of wheel rotation and sectionally profiled to complement the prescribed sectional profile form of the portion of the finished surface to be produced at only one side of the axis of symmetry thereof, said wheel being disposed throughout said operation to bear against said body so as to provide abrading contact therewith only at one side of the axis of symmetry thereof.

2. A method of shaping a glass body so as to provide thereon a lens having a convex shaped finished surface generated about an axis of symmetry, said method comprising the operation of rotating said body about said axis of symmetry while pressing an abrading wheel against said body and while rotating said wheel about an axis substantially parallel to and offset from said axis of symmetry, said wheel having an abrading face portion thereof sectionally profiled to complement the prescribed sectional profile form of the surface to be produced at positions extending in only one direction radially of the axis of symmetry thereof, said wheel being disposed throughout said operation to bear against said body so as to provide abrading contact therewith at only one position radially of the axis of symmetry thereof.

3. A method of shaping a glass body so as to produce thereon a curved finished surface having an axis of symmetry, said method comprising rotating said body about said axis of symmetry while pressing an abrading tool to thrust against said body in the same direction as said axis of symmetry and while rotating said tool about an axis substantially parallel to and offset from said axis of symmetry, said tool having an abrading face portion thereof sectionally profiled to complement the prescribed sectional profile form of the surface to be produced at a position extending radially of the axis of symmetry thereof in only one direction therefrom, said tool being disposed to bear against said body so as to provide abrading contact therewith at positions therealong extending only from one side of the axis of symmetry thereof.

4. A method of shaping a glass body so as to provide thereon a curved finished surface having an axis of symmetry, said method comprising rotating said body about said axis of symmetry while pressing a bonded abrasive tool to thrust against said body in the same direction as said axis of symmetry while rotating said tool about an axis substantially parallel to and offset from said axis of symmetry, said tool having the abrading face portion thereof of a diameter substantially greater than the diameter of said glass body and sectionally profiled and arranged to bear against and to complement the prescribed sectional profile form of the surface to be produced at only one side of the axis of symmetry thereof.

5. A method of shaping a glass body so as to produce therefrom a curved surface lens having a curved surface axis of symmetry, said method comprising the operation of rotating said body about said axis of symmetry while pressing a bonded abrasive wheel against said body while rotating said wheel about an axis substantially parallel to and offset from said axis of symmetry, said wheel having an abrading face portion thereof sectionally profiled to complement the prescribed sectional profile form of the portion of the finished surface to be produced at only one side of the axis of symmetry thereof, said wheel being disposed to bear throughout said operation against said body so as to provide abrading contact therewith only at one side of the axis of symmetry thereof.

6. A method of shaping a glass body so as to produce thereon a curved finished surface generated about an axis of symmetry, said method comprising the operation of rotating said body about said axis of symmetry while pressing a bonded abrasive tool against said body while moving said tool about an axis substantially parallel to said axis of symmetry, said tool having an abrading face portion thereof sectionally profiled to complement the prescribed sectional profile form of the surface to be produced only in a direction radially of the axis of symmetry thereof, said tool being disposed to bear against said body so as to provide abrading contact therewith throughout said operation only at one side of the axis of symmetry thereof.

VICTOR WALKER.